Patented Dec. 16, 1941

2,266,036

UNITED STATES PATENT OFFICE 2,266,036

METHOD OF TREATING OILS AND PRODUCT

Herbert Hempel, Essex, Mass., assignor to Gorton-Pew Fisheries Company, Ltd., Gloucester, Mass., a corporation of Massachusetts No Drawing. Application November 9, 1938, Serial No. 239,689

12 Claims. (Cl. 260—412.5)

The present invention relates to a method for the recovery of fish oils.

In the customary procedure of making fish meal by putting fish or fish scrap through a press, the liquor which is expelled contains a considerable proportion of oil. This oil is dispersed or emulsified in the water and other matter of the press liquor, but can often be coalesced by boiling and then separated by gravity into a continuous layer, which floats to the top and may be drawn off, after a sufficient length of time.

Such procedure, however, is subject to the difficulty that boiling is frequently ineffective to liberate the oil from such mixtures, so that while the charge may contain a considerable amount of oil very little is recovered. Another difficulty is that the oil, when recovered in this way, may contain 3% to 5% or more of free fatty acids. These are not desired in the oil because of their greater chemical activity and resultant properties.

By the present invention it is found that the press liquor may be conveniently treated to overcome both of these difficulties and consistently to produce an improved fish oil.

For example, in handling rosefish or "red fish," as it is sometimes called, in the operation of the press to prepare fish meal, the liquor is separated from the press cake and collected in the usual way. This liquor is then treated with approximately 100 grams of tri-sodium phosphate to each gallon of liquor. The mixture is then heated to boiling and cooked, either indirectly or by injecting live steam, and preferably with active agitation in both cases. Toward the end of the cooking, it is desirable though not essential to add common salt (sodium chloride) to a concentration of about 1%. This effectively increases the specific gravity of the liquid. The charge is then allowed to stand and cool, whereupon the oil segregates and coalesces into globules which rise to the top and form a continuous, clarified oil fraction which is easily withdrawn. Moreover, the oil as thus obtained not only comprises substantially all of the fish oil present but is appreciably lower in free fatty acids,—not exceeding 1%, and usually much less.

Since the oil which is contained in such liquors as they are expelled is probably associated with small particles of the tissue of the fish from which it was derived, it is clear that in the treatment of such liquors the oil must be first segregated from such solids before it can coalesce and separate. It is believed that the sodium phosphate effects such liberation and segregation of the entrained, minute globules or films. This result may be effected by the dissolution of the phosphate, which is readily soluble and strongly alkaline, followed by the penetration of the resulting solution into the dispersed solid particles and consequent wetting of them with water. At the same time the surface tension of the aqueous phase is reduced. Moreover, the particles of solid matter and especially of the entrained liquid oil may carry electric charges, and if so they will be discharged by the electrolyte—still further to permit and promote the separation and independent coalescence of the water-wet solids and rapid coalescence of the liberated oil particles into a separable layer.

While the tri-sodium phosphate is effectively alkaline and may react with and neutralize the free fatty acid present, it does not substantially saponify the oil. Moreover, the boiling operation and consequent tendency to hydrolyze the oil and to form free fatty acid is greatly lessened. Accordingly, substantially none of the oil in the liquor treated is destroyed but is almost completely segregated and easily recovered. And the treated oil product is substantially without free fatty acid content.

Tri-sodium phosphate has been specifically referred to, as it is a representative and preferred reagent for carrying out the process of the invention. This is attributable to the fact that, while it is strongly alkaline, the caustic component is buffered in its action by the presence of the phosphate radical. This buffer action is important since it would otherwise be free to saponify the oil, which is not desired and would constitute a loss of yield, and also the formation of products of hydrolysis which might be soluble in and hence retained by the oil, detrimentally. On the other hand, tri-sodium phosphate reacts with free fatty acids to convert them to soluble alkali metal salts or soaps, which will separate from the oil and be found in the aqueous phase of the mixture. In such reaction, moreover, the phosphate radical is not liberated as a free acid, but will remain associated with the non-reacted sodium component,—as di-sodium or as monosodium phosphate, and continue to be completely dissolved in the water solution, as a substantially inert salt.

The pH values of charges of liquor obtained from redfish and treated as above described, are given in the following table:

I

| Grams tri-sodium phosphate per gallon | pH at 100° F. | pH at 205° F. |
|---|---|---|
| 25 | 7.90 | 7.70 |
| 50 | 8.45 | 8.00 |
| 75 | 9.25 | 9.00 |
| 100 | 10.10 | 9.60 |

The following pH values are for solutions of tri-sodium phosphate in water alone, under conditions otherwise corresponding to those above:

II

| Grams tri-sodium phosphate per gallon | pH at 100° F. | pH at 205° F. |
|---|---|---|
| 25 | 10.2 | 10.18 |
| 50 | 10.36 | 10.32 |
| 75 | 10.43 | 10.40 |
| 100 | 10.56 | 10.49 |

It is to be remarked that, from these tables, it is shown that increase of temperature causes a slight falling off of pH values in the water solutions of the phosphate. Also, that while the pH values of correspondingly treated fish meal liquor is lower at 100° F., as would be expected, in accordance with the above disclosure,—it is considerably lower still at 205° F. showing that heating effects further neutralization of free fatty acids, which probably are not sufficiently soluble in water to affect the pH values at the lower temperature of 100° F., but upon heating combine with and neutralize some of the phosphate.

It will be clear that free caustic alkalies would not be suitable, on the one hand, for the purpose of carrying out this process. On the other hand, alkaline buffer reagents, which are in this respect similar to tri-sodium phosphate, such as sodium carbonate, sodium bicarbonate (with addition of sodium carbonate or other stronger alkali), sodium orthoborate, etc., are suitable, and corresponding potassium salts will serve also.

Ammonium hydroxide, which is alkaline and at the same time exhibits a decided buffer action similar to that of buffer salts, may likewise be used for this process. Moreover, with ammonia, the foaming and formation of layers of large volume is not incurred so much as with the alkaline metal buffer salts. In this case, the addition of common salt for increasing the specific gravity and promoting segregation of the oil is not practicable, but soluble agents (such as non-ionized organic substances) which are compatible with the ammoniacal charge may be added for this purpose.

Accordingly, the use of all of these reagents is contemplated as applicable in carrying out the process, although they are not so satisfactory as tri-sodium phosphate, which does not foam and presents other very desirable features in the practical operation of the invention.

It is to be understood that in carrying out the process as above described, various modifications may be made in the procedure and in the reagents used without departing from the invention. Thus, the above reagents may be used separately as described or certain admixtures of them may be applied with corresponding effects.

I claim:

1. Method for the recovery of fish oil from press liquor, comprising the steps of treating the liquor with an alkaline buffer reagent, and separating the aqueous fraction from the oil fraction.

2. Method for the recovery of fish oil from press liquor, comprising the steps of treating the liquor with an alkaline buffer salt, and separating the aqueous fraction from the oil fraction.

3. Method for the recovery of fish oil from press liquor, comprising the steps of treating the liquor with tri-sodium phosphate, and separating the aqueous fraction from the oil fraction.

4. Method for the recovery of fish oil from press liquor, comprising the steps of treating the liquor with ammonium hydroxide, and separating the aqueous fraction from the oil fraction.

5. Method for the recovery of fish oil from press liquor, comprising the steps of treating the liquor with an alkaline buffer reagent, heating, agitating, and separating the aqueous fraction from the oil fraction.

6. Method for the recovery of fish oil from press liquor, comprising the steps of treating the liquor with an alkaline buffer salt, heating, agitating, and separating the aqueous fraction from the oil fraction.

7. Method for the recovery of fish oil from press liquor, comprising the steps of treating the liquor with tri-sodium phosphate, heating, agitating, and separating the aqueous fraction from the oil fraction.

8. Method for the recovery of fish oil from press liquor, comprising the steps of treating the liquor with ammonium hydroxide, heating, agitating, and separating the aqueous fraction from the oil fraction.

9. Method for the recovery of fish oil from press liquor, comprising the steps of treating the liquor with an alkaline buffer reagent, thereby to segregate and coalesce the oil, and then separating the aqueous fraction from the segregated and coalesced fish oil, by gravity.

10. Method for the recovery of fish oil from press liquor, comprising the steps of treating the liquor with an alkaline buffer salt, thereby to segregate and coalesce the oil, and then separating the aqueous fraction from the segregated and coalesced fish oil, by gravity.

11. Method for the recovery of fish oil from press liquor, comprising the steps of treating the liquor with an alkaline buffer reagent, heating, agitating, and cooling, thereby to segregate and coalesce the oil, and separating the aqueous fraction from the segregated and coalesced fish oil, by gravity.

12. Method for the recovery of fish oil from press liquor, comprising the steps of treating the liquor with an alkaline buffer salt, heating, agitating, and cooling, thereby to segregate and coalesce the oil, and separating the aqueous fraction from the segregated and coalesced fish oil, by gravity.

HERBERT HEMPEL.